United States Patent
Molina

(10) Patent No.: US 10,027,929 B2
(45) Date of Patent: *Jul. 17, 2018

(54) SYSTEM FOR LAW ENFORCEMENT RECORDING

(71) Applicant: Larry Molina, Fulton, TX (US)

(72) Inventor: Larry Molina, Fulton, TX (US)

( * ) Notice: Subject to any disclaimer, the term of this patent is extended or adjusted under 35 U.S.C. 154(b) by 100 days.

This patent is subject to a terminal disclaimer.

(21) Appl. No.: 15/054,443

(22) Filed: Feb. 26, 2016

(65) Prior Publication Data

US 2017/0251175 A1    Aug. 31, 2017

(51) Int. Cl.
  *H04N 7/18*    (2006.01)
  *H04N 5/232*   (2006.01)

(52) U.S. Cl.
  CPC ......... *H04N 7/181* (2013.01); *H04N 5/23238* (2013.01)

(58) Field of Classification Search
  CPC .......................... H04N 5/23238; H04N 7/181
  USPC ........................................................ 348/159
  See application file for complete search history.

(56) References Cited

U.S. PATENT DOCUMENTS

| | | | | |
|---|---|---|---|---|
| 7,542,665 B2* | 6/2009 | Lei | ..................... | G02B 27/0093 348/333.03 |
| 2001/0010555 A1* | 8/2001 | Driscoll, Jr. | ........... | G02B 13/06 348/335 |
| 2003/0193606 A1* | 10/2003 | Driscoll, Jr. | ........... | G02B 13/06 348/335 |
| 2006/0220981 A1* | 10/2006 | Murai | ................... | G06F 3/0304 345/1.1 |
| 2010/0026809 A1* | 2/2010 | Curry | ..................... | H04N 5/222 348/157 |
| 2010/0060733 A1* | 3/2010 | Lakshmanan | .......... | H04N 7/185 348/143 |
| 2010/0097443 A1* | 4/2010 | Lablans | ................. | G03B 37/00 348/36 |
| 2012/0182392 A1* | 7/2012 | Kearns | ................... | B25J 11/009 348/46 |
| 2016/0255126 A1* | 9/2016 | Sarris | ................... | H04L 65/1096 348/14.08 |
| 2017/0133051 A1* | 5/2017 | Mack | ..................... | A41D 1/002 |
| 2017/0143249 A1* | 5/2017 | Davis | ..................... | A61B 5/441 |

* cited by examiner

*Primary Examiner* — Shan E Elahi
(74) *Attorney, Agent, or Firm* — Law Office of Jerry D. Haynes

(57) ABSTRACT

A system for law enforcement recording that includes: a robotic dash camera; a position transmitter on the robotic dash camera; a prism receiver, where the prism receiver is adapted to be worn by a user; and a mobile camera. The mobile camera may be placed on a mountable band, where the mountable band includes a series of lights. The robotic dash camera captures panoramic views surrounding the prism receiver.

5 Claims, 1 Drawing Sheet

SYSTEM FOR LAW ENFORCEMENT RECORDING

BACKGROUND OF THE INVENTION

Field of Invention

The present invention relates to a system to record the activities of law enforcement personnel.

Description of Related Art

Scrutiny of law enforcement activities have increased and further expansion of video recording has been suggested. Many police departments are utilizing body cams in order to record police activity during active duty. Further dash cams are also used to record police activity on a traffic stop and other arrests that may occur. One drawback to the use of dash cams is that the dash camera is restricted in its range of view. This view of the dash cam is directed in a forward position away from the police vehicle. One drawback to this limited range is that on occasion police activity goes outside of the line of sight of the dash cam and therefore the amount of evidence and proof available will be limited or diminished. As a result, it would be advantageous to have a system that could actively follow the police officer during a traffic stop or while engaging other arrests or police activity.

SUMMARY OF THE INVENTION

The present invention relates to a system for law enforcement recording that includes: a robotic dash camera; a position transmitter on the robotic dash camera; a prism receiver, where the prism receiver is adapted to be worn by a user; and a mobile camera. The mobile camera may be placed on a mountable band, where the mountable band includes a series of lights. The robotic dash camera captures panoramic views surrounding the prism receiver.

DETAILED DESCRIPTION

The present invention relates to a system that implements a robotic dash cam that is engaged with a receiver worn by a police officer. The receiver is detected by the robotic camera and the camera follows the movement of the officer who is wearing the receiver. Further, the officer wears a mobile camera to provide further recording of activity that the officer may engage in. The present invention relates to a system to record law enforcement activity in the form of a robotic camera with panoramic capability. The camera is synced with a prism receiver that helps to track the movement of a police officer. A transmitter on the camera tracks the receiver so the camera follows the movement of the officer while on active duty.

Figure 1:
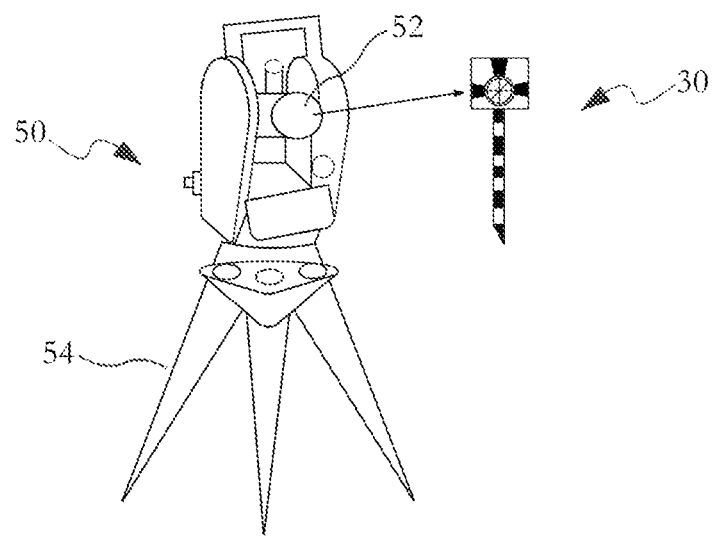
FIG. 1 depicts a robotic camera in accordance with the present invention.

In reference to FIG. 1, a robotic camera (50) is depicted. The robotic camera (50) works in conjunction with a receiver (30) shown in FIG. 1. A transmitter (52) on the camera (50) syncs with the receiver (30) from the camera (50). This transmitter (52) enables an automatic adjustment of the focus and range of the camera (50) and allows the camera (50) to follow movement associated with the prism receiver (30). Mounting legs (54) are also depicted in FIG. 1, which enable the mounting of a robotic camera into the motor vehicle of a police officer.

Figure 2:
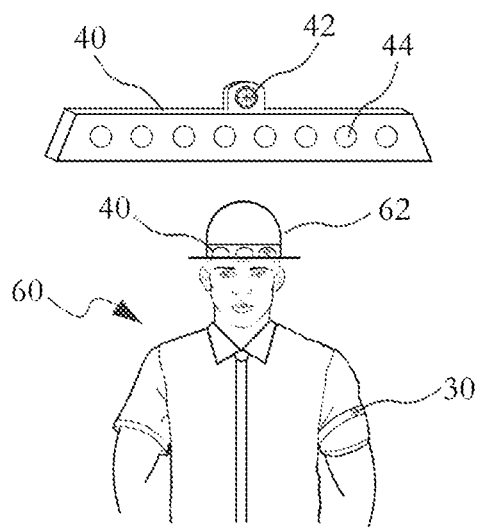
FIG. 2 depicts a mobile camera and a prism receiver used in accordance with the present invention.

FIG. 2 depicts use of the prism receiver (30) in the form of an armband as shown on a police officer (60). The police officer (60) also wears a strip (40). The strip (40) includes a camera (42) along with lighting (44). This strip (40) may be attached to a police officer's hat (52) as shown in FIG. 2. The camera (42) provides another means of recording police activity. Further the robotic camera (50) is tracking the movement of the police officer through the movement of the prism receiver (30) as shown in FIG. 2. This system provides a complete visual recording of activities associated with the police officer (60) by providing panoramic views captured by robotic camera (50) and closer views captured by camera (42) worn by the police officer (60). As a result, a dual camera system is provided along a greater collection of visual evidence regarding police officer activity. The instant invention has been shown and described in what it considers to be the most practical and preferred embodiments. It is recognized, however, that departures may be made there from within the scope of the invention and that obvious modifications will occur to a person skilled in the art.

What is claimed is:

1. A system for law enforcement recording comprising:
   a. a dash camera;
   b. mounting legs, wherein the mounting legs enable the mounting of the dash camera within a vehicle;
   c. a position transmitter on the dash camera;
   d. a receiver, where the receiver is adapted to be worn by a user, where the dash camera captures panoramic views surrounding the receiver, wherein said dash camera syncs with the positioning of the receiver with the position transmitter and said position transmitter enables automatic adjustment of focus and range of the dash camera; and
   e. a mobile camera, where the mobile camera is worn by the user.

2. The system for law enforcement recording system according to claim 1, where the mobile camera is placed on a mountable band.

3. The system for law enforcement recording system according to claim 2, where the mountable band includes a series of lights.

4. The system for law enforcement recording system according to claim 1, where the user is a law enforcement officer.

5. The system for law enforcement recording system according to claim 2, where the mountable band is placed in a hat of the user.

* * * * *